(No Model.)
C. E. SMITH & L. C. KENDALL.
DEVICE FOR RELEASING ANIMALS.
No. 361,726. Patented Apr. 26, 1887.
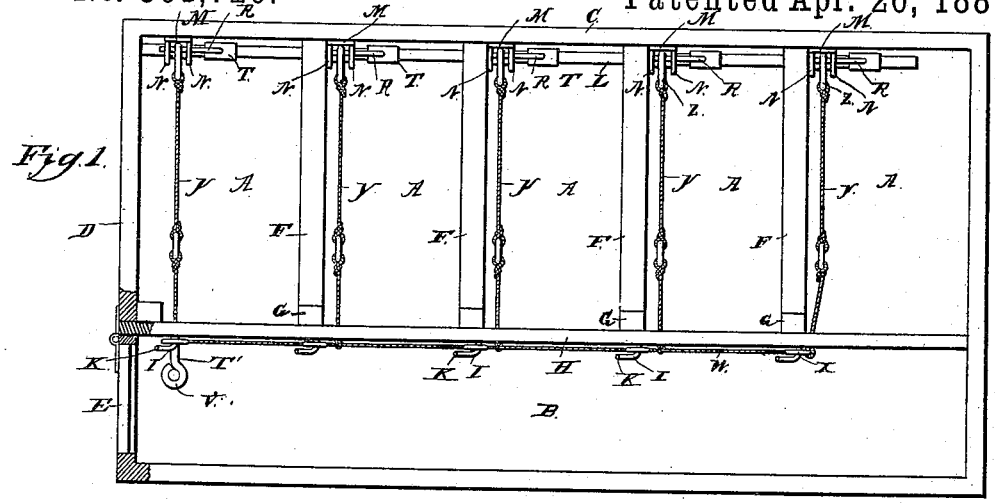
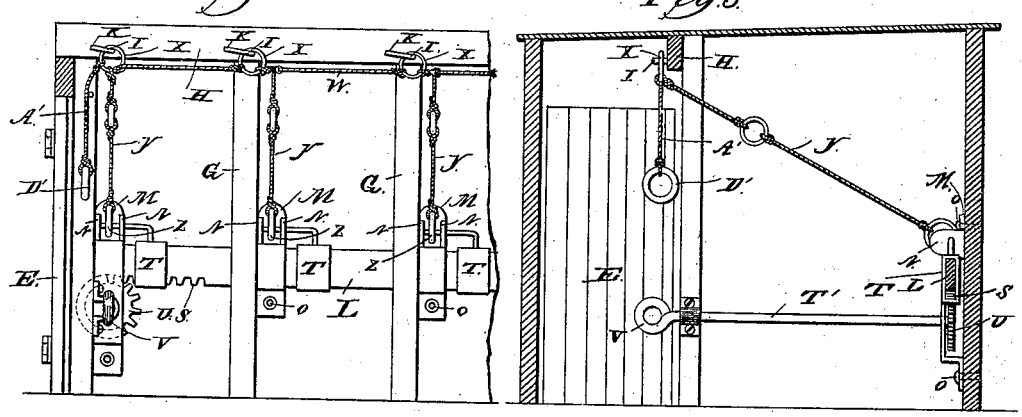
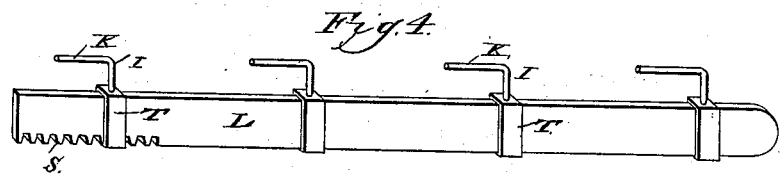
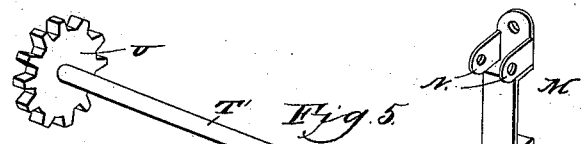
Witnesses
M. E. Fowler
J. W. Garner
Inventors
Chas. E. Smith
L. C. Kendall
By their Attorneys
N. PETERS, Photo-Lithographer, Washington, D. C.

UNITED STATES PATENT OFFICE.

CHARLES EUCEBIUS SMITH AND LOUIS CASS KENDALL, OF FRANKFORD, MO.

DEVICE FOR RELEASING ANIMALS.

SPECIFICATION forming part of Letters Patent No. 361,726, dated April 26, 1887.

Application filed January 18, 1887. Serial No. 224,722. (No model.)

*To all whom it may concern:*

Be it known that we, CHARLES EUCEBIUS SMITH and LOUIS CASS KENDALL, citizens of the United States, residing at Frankford, in the county of Pike and State of Missouri, have invented a new and useful Improvement in Devices for Releasing Animals, of which the following is a specification.

Our invention relates to an improvement in devices for releasing animals; and it consists in the peculiar construction and combination of devices that will be more fully set forth hereinafter, and particularly pointed out in the claims.

The object of our invention is to provide a device whereby all the horses or cattle on one side of the stable may be simultaneously released from their stalls and led out of the same from a burning stable without the necessity of the person who releases the animals endangering his life by going into the stable in order to do so.

In the drawings, Figure 1 is a plan view of a row of stalls in a stable provided with our improved releasing and extricating devices. Fig. 2 is an interior elevation of the same from the rear end of the stalls. Fig. 3 is a transverse vertical sectional view taken on the line $x$ $x$ of Fig. 2. Figs. 4 and 5 are detailed views.

A represents a series of stalls, which are arranged side by side, and B represents an alley or open space in rear of the stalls.

C represents the side of the stable which forms the front ends or heads of the stalls, and D represents the side of the stable having a door, E, which opens into one end of the alley or space B. The partitions F, which divide the stalls, are each provided at their rear ends with a vertical post, G, and the upper ends of the said posts are connected by a horizontal bar, H. Hooks I are driven into the said bar at points which register with the posts, and the arms K of the said hooks are arranged parallel with the said bar, and are upturned at a slight angle.

L represents a bar, which is arranged on the inner side of the side C at the heads of the stalls, and is secured and guided in keepers M, which are attached to the side C, and thereby the said bar L is adapted to be moved lengthwise. Each of the keepers M is provided at its upper end with a pair of outwardly-extending ears, N, having aligned openings, and the said keepers are secured to the side C by means of screws or bolts O, which pass through openings that are made in the upper and lower ends of the keepers.

T represents clamping-rings, which are secured on the movable bar L. To each of the said clamping-rings is attached a horizontal bolt, R, which is adapted to enter the aligned openings in the ears of one of the keepers. The said keepers are arranged at the head of each stall on the side which is nearest the door E. The front end of the bar L is provided on its under side with a series of rack-teeth, S.

T' represents a turning-rod, which is journaled near its outer end in a suitable bearing attached to the inner side of the post G, which is nearest the side D of the stable, and the inner end of the said turning-rod is journaled in the keeper which is also nearest the said side D of the stable, the extreme front end of the turning-rod being provided with a rack-pinion, U, adapted to engage the rack-teeth of the bar L. The rear end of the turning-rod is provided with a handle or ring, V, by means of which the said rod may be turned so as to cause the bar L to move in either direction. When the said turning-rod is turned in one direction, the bar L will move from the side D of the stable, so as to withdraw the bolts R from the openings in the ears of the keeper, and by turning the turning-rod in the contrary direction the bar L will be moved toward the side D of the stable, so as to cause the said bolts to pass through the openings in the said ears.

W represents the main cord or chain, which is provided with a series of rings, X, that are placed on the hooks I, arranged upon the horizontal bar H. From the rings X extend a series of branch cords or chains, Y, which are provided at their outer ends with rings Z, adapted to be engaged by the bolts R when the latter are moved forward by the bar L, so as to lock the said rings upon the said bolts between the ears of the keepers. The halter-straps of the horses or cattle are attached to the rings Z when the animals are confined in the stalls.

From the front end of the main cord or chain depends a branch cord or chain, A', which is arranged just within the door E, and is provided at its lower end with a ring, D'.

The operation of our invention is as follows: In the event that the stable should take fire, the attendant opens the door E, and without going into the stable grasps the handle or ring of the turning-rod and rotates the same, so as to cause the bar L to move outwardly and thereby cause the bolts R to release the rings Z, which are attached to the branch cords or chains Y, and to which the animals are secured. He then grasps the ring D' of the branch chain or cord A', and draws forwardly upon the same, which causes the rings X to slip from the arms K of the hooks I, and thereby permit the main cord or chain W to drop to the ground. As the attendant walks from the stable he draws the main cord or chain W after him, thus causing the branch cords or chains Y to draw upon the heads of the animals and turn the latter about in their stalls in the direction facing the door E, and as the attendant continues to proceed from the burning stable it will be readily observed that all the animals in the stalls attached to the main rope or chain will be led after him at the same time out of the stable, and may be readily directed to a place of safety and secured.

Having thus described our invention, we claim—

1. The combination of the endwise moving rod having the locking-bolts at the heads of the stalls, the elevated hooks I at the rear ends of the stalls, the main rope W, having the rings X, engaging the hooks and thereby supporting the rope therefrom, and the branch ropes Y, extending from the main rope to the heads of the stalls and having the rings to engage the locking bolts, for the purpose set forth, substantially as described.

2. The combination of the endwise-movable rod L at the heads of the stalls, and having the rack-teeth S, and the series of locking-bolts R, the keepers at the heads of the stalls to guide and support the rod and having the ears N, provided with aligned openings to receive the locking-bolts, the turning-shaft T', having the pinion U, engaging the rack-teeth S, the elevated hooks I at the rear ends of the stalls, the main rope W, having the rings X, engaging the said hooks, and the branch ropes Y, extending from the main rope to the heads of the stalls and having the rings to engage the locking-bolts, substantially as described.

In testimony that we claim the foregoing as our own we have hereto affixed our signatures in presence of two witnesses.

CHARLES EUCEBIUS SMITH.
  LOUIS CASS KENDALL.

Witnesses:
  H. J. PARRISH,
  F. T. ADAMS.